United States Patent
Wilson et al.

[11] Patent Number: 6,155,432
[45] Date of Patent: Dec. 5, 2000

[54] HIGH PERFORMANCE FILTERS BASED ON INORGANIC FIBERS AND INORGANIC FIBER WHISKERS

[75] Inventors: Doug Wilson, Laguna Beach; Gary Pruett, Cypress; Shrikant Awasthi, Cerritos, all of Calif.

[73] Assignee: Hitco Carbon Composites, Inc., Gardena, Calif.

[21] Appl. No.: 09/244,732

[22] Filed: Feb. 5, 1999

[51] Int. Cl.$^7$ .................................................. B01D 71/02
[52] U.S. Cl. .......................... 210/505; 210/503; 210/508; 210/509; 210/500.26; 210/645; 210/651; 55/523; 55/524; 428/224; 428/359; 428/408; 162/146; 162/152
[58] Field of Search .................. 210/500.1, 503, 210/505, 508, 509, 198.2, 500.25, 500.26, 510.1, 651, 645; 428/359, 439, 408, 224; 55/523, 524; 162/145, 141, 146, 152

[56] References Cited

U.S. PATENT DOCUMENTS

| | | | |
|---|---|---|---|
| 3,174,895 | 3/1965 | Gibson et al. | 161/259 |
| 3,458,329 | 7/1969 | Owens et al. | 106/39 |
| 3,462,289 | 8/1969 | Rohi et al. | 117/46 |
| 3,510,394 | 5/1970 | Cadotte | 162/145 |
| 3,591,010 | 7/1971 | Pall et al. | 210/493.1 |
| 4,225,569 | 9/1980 | Matsui et al. | 423/445 |
| 4,231,768 | 11/1980 | Seibert et al. | 55/179 |
| 4,256,607 | 3/1981 | Yoshida et al. | 252/117 |
| 4,284,612 | 8/1981 | Horne, Jr. et al. | 423/345 |
| 4,391,787 | 7/1983 | Tibbetts | 423/447.3 |
| 4,412,937 | 11/1983 | Ikegami et al. | 502/423 |
| 4,491,569 | 1/1985 | Tibbetts | 423/447.3 |
| 4,497,788 | 2/1985 | Bradley et al. | 423/447.3 |
| 4,499,134 | 2/1985 | Whitely et al. . | |
| 4,500,328 | 2/1985 | Brassell et al. | 55/97 |
| 4,552,786 | 11/1985 | Berneburg et al. | 427/249 |
| 4,565,683 | 1/1986 | Yates et al. | 423/447.3 |
| 4,565,684 | 1/1986 | Tibbetts et al. | 423/447.3 |
| 4,663,230 | 5/1987 | Tennent | 428/367 |
| 4,687,697 | 8/1987 | Cambo et al. . | |
| 4,749,557 | 6/1988 | Yetter et al. | 423/447.3 |
| 4,772,508 | 9/1988 | Brassell | 428/218 |
| 4,806,206 | 2/1989 | Kamijo et al. | 162/145 |
| 4,818,612 | 4/1989 | Hara et al. | 428/367 |
| 4,842,909 | 6/1989 | Brassell | 428/34.1 |
| 4,846,866 | 7/1989 | Chyng et al. . | |
| 4,855,122 | 8/1989 | Kitamura et al. | 423/447.1 |
| 4,865,739 | 9/1989 | Bauer et al. | 210/490 |
| 4,917,941 | 4/1990 | Hillig et al. | 428/283 |
| 4,944,996 | 7/1990 | Bauer et al. | 428/307.7 |
| 4,956,316 | 9/1990 | Sawyer | 501/88 |
| 4,963,515 | 10/1990 | Helferich . | |

(List continued on next page.)

FOREIGN PATENT DOCUMENTS

| | | | |
|---|---|---|---|
| 2078807 | 1/1992 | United Kingdom | 210/509 |

*Primary Examiner*—Ana Fortuna
*Attorney, Agent, or Firm*—Renner, Kenner, Greive, Bobak, Taylor & Weber

[57] ABSTRACT

A filter media structure, which is capable of operating in the micro- and nanofiltration regime, offers: low cost, durability, high temperature and chemical resistance, high permeability, high flow rate, low pressure drop across the filter media, high mechanical strength, separation efficiency, and biocompatibility. The filter media structure is comprised of mixture of carbon or ceramic fibers and inorganic fiber whiskers generally having a diameter of from about 0.03 to about 5 microns. The present invention further provides a method of preparing a filter media structure comprising mixing together a) inorganic fibers; b) inorganic fiber whiskers; c) a water soluble binder, and optionally depositing a thin layer of pyrolytic carbon on the surface of the inorganic fibers and inorganic fiber whiskers comprising the filter media structure. The filter media structure is selected from the group consisting of a paper, felt and fabric. The present invention provides a further method for preparing a filter media structure comprising a) mixing together inorganic fiber whiskers and a resin selected from the group consisting of thermosetting and thermoplastic resins; b) impregnating inorganic fibers with said inorganic fiber whisker/resin mixture to form a paper.

51 Claims, 3 Drawing Sheets

U.S. PATENT DOCUMENTS

| | | | |
|---|---|---|---|
| 4,963,640 | 10/1990 | Dewhurst | 528/73 |
| 4,968,467 | 11/1990 | Zievers | 264/62 |
| 4,986,914 | 1/1991 | Franks | 210/502.1 |
| 4,990,165 | 2/1991 | Bikson et al. | 55/158 |
| 4,992,318 | 2/1991 | Gadkaree | 428/114 |
| 5,024,818 | 6/1991 | Tibbetts et al. | 423/447.3 |
| 5,053,107 | 10/1991 | Barber, Jr. et al. | 162/145 |
| 5,071,631 | 12/1991 | Takabatake | 423/445 |
| 5,080,963 | 1/1992 | Tatarchuk et al. | 428/225 |
| 5,091,164 | 2/1992 | Takabatake | 423/445 |
| 5,098,454 | 3/1992 | Carpentier et al. | 55/523 |
| 5,102,745 | 4/1992 | Tatarchuk et al. | 428/605 |
| 5,114,762 | 5/1992 | Bontems et al. | 428/34.5 |
| 5,124,856 | 6/1992 | Brown et al. | 360/97.03 |
| 5,149,584 | 9/1992 | Baker et al. | 428/297 |
| 5,165,909 | 11/1992 | Tennent et al. | 423/447.3 |
| 5,171,560 | 12/1992 | Tennent | 423/447.3 |
| 5,183,546 | 2/1993 | Oren et al. | 204/290 |
| 5,192,473 | 3/1993 | Hruska et al. | 264/102 |
| 5,196,120 | 3/1993 | White | 210/504 |
| 5,198,007 | 3/1993 | Moyer et al. | 55/523 |
| 5,230,960 | 7/1993 | Izuka | 428/408 |
| 5,231,061 | 7/1993 | Devore | 501/95 |
| 5,254,396 | 10/1993 | Takemura et al. | 428/225 |
| 5,283,113 | 2/1994 | Nishimura et al. | 428/280 |
| 5,353,949 | 10/1994 | Seibert et al. | 220/371 |
| 5,368,633 | 11/1994 | Foldyna et al. . | |
| 5,372,380 | 12/1994 | Duffy et al. | 280/740 |
| 5,374,415 | 12/1994 | Alig et al. | 423/447.3 |
| 5,376,598 | 12/1994 | Preedy et al. | 501/89 |
| 5,389,400 | 2/1995 | Ting et al. | 427/249 |
| 5,398,840 | 3/1995 | Luhman et al. | 210/508 |
| 5,407,734 | 4/1995 | Singh et al. . | |
| 5,413,773 | 5/1995 | Tibbetts et al. | 423/447.3 |
| 5,413,866 | 5/1995 | Baker et al. | 423/447.3 |
| 5,433,906 | 7/1995 | Dasch et al. | 264/117 |
| 5,458,181 | 10/1995 | Corbett et al. | 164/97 |
| 5,458,784 | 10/1995 | Baker et al. | 210/674 |
| 5,482,773 | 1/1996 | Bair et al. | 428/368 |
| 5,492,677 | 2/1996 | Yoshikawa | 422/174 |
| 5,578,543 | 11/1996 | Tennent et al. | 502/180 |
| 5,589,152 | 12/1996 | Tennent et al. | 423/447.3 |
| 5,594,060 | 1/1997 | Alig et al. | 524/496 |
| 5,604,037 | 2/1997 | Ting et al. | 428/408 |
| 5,618,875 | 4/1997 | Baker et al. | 524/495 |
| 5,626,650 | 5/1997 | Rodriguez et al. | 95/116 |
| 5,650,370 | 7/1997 | Tennent et al. | 502/174 |
| 5,653,951 | 8/1997 | Rodriguez et al. | 423/439 |
| 5,691,054 | 11/1997 | Tennent et al. | 428/359 |
| 5,707,916 | 1/1998 | Snyder et al. | 502/180 |
| 5,735,332 | 4/1998 | Ritland et al. | 164/98 |
| 5,744,236 | 4/1998 | Rohrbach et al. | 428/372 |
| 5,759,394 | 6/1998 | Rohrbach et al. | 210/264 |
| 5,780,126 | 7/1998 | Smith et al. | 428/34.5 |
| 5,800,706 | 9/1998 | Fischer | 210/198.2 |
| 5,888,393 | 3/1999 | Luhman et al. | 210/510.1 |
| 5,985,112 | 11/1999 | Fischer | 204/283 |

HIGH PERFORMANCE FILTERS BASED ON INORGANIC FIBERS AND INORGANIC FIBER WHISKERS

TECHNICAL FIELD OF THE INVENTION

The present invention is directed to novel high performance filters having characteristics suitable for use in various filtration applications, such as microfiltration. More particularly, this invention is directed to a novel high performance filter media comprising a blend of conventional carbon, ceramic, glass or silica fibers and inorganic fiber whiskers that is low in cost, durable, resistant to chemicals and high temperatures, not subject to particulation, high in mechanical strength and separation efficiency, and biocompatible.

BACKGROUND OF THE INVENTION

The prior art provides many types of materials which remove, filter, or capture gases and particulate materials. These filters of the art, while fairly effective in the applications for which they were designed, do not offer the efficiency, performance, and durability demanded by new, high performance applications.

The demand for higher quality materials, reduced manufacturing costs, and environmentally clean processes is forcing industry to move away from traditional methods of separation and purification, such as distillation and pasteurization, towards the use of filtration. Filter systems are now capable of offering low energy, more efficient, and environmentally friendly operations. Unfortunately, the widespread use of high performance filtration is restricted by the lack of suitable filter media materials. Such media must offer low cost; durability; chemical resistance, particularly to acids and alkalis; resistance to high temperatures, for both operation and sterilization purposes; no particulation (i. e., release of filter media particles into the filtrate stream); mechanical strength to cope with pressure swings; separation efficiency, particularly for particles in the 0.1 to 100 microns range; and biocompatibility for certain applications such as the filtration of blood.

Table 1 below lists the currently available filter media materials together with their advantages and disadvantages.

TABLE 1

Currently Available Filter Media Materials

| Material | Applications material is suitable for | Maximum Operating Temp. (° C.) | Principle Advantages | Principle Disadvantages |
| --- | --- | --- | --- | --- |
| Cotton | Aqueous solutions, oils, fats, and waxes | 90 | Inexpensive | Subject to fungal attack |
| Nylon | Acids, petrochemicals, and solvents | 150 | High strength and flexibility; long life, and good solids discharge | Absorbs water and subject to attack by alkalis |
| Polyester | Acids, common organic solvents, and oxidizing agents | 100 | Good strength and flexibility | Subject to attack by alkalis |
| PVC | Acids and alkalis | 90 | | May become brittle; and poor heat resistance |
| PTFE | Virtually all chemicals | 200 | Extreme chemical resistance | High cost |
| Polyethylene | Acids and alkalis | 70 | | Softens at moderate temperatures |
| Polypropylene | Acids, alkalis, and solvents (except aromatics and chlorinated solvents) | 130 | | Not suitable for use with aromatics and chlorinated solvents |
| Glass fiber | Concentrated hot acids, and chemical solutions | 250 | Wide range of hot or cold solvents | Subject to attack by alkalis and some acids |
| Stainless Steel | Most environments | >300 | Good resistance to most environments | Expensive and size range limitations |
| Ceramics | Most environments | 1000 | Good resistance to most environments | Expensive and complex manufacturing methods required; and poor durability |

As presented in Table 1, no one filtration material offers the required balance of properties needed for new, high performance applications.

Ceramic filter media have made some inroads, however their acceptance is hampered by the following: high cost because expensive and complex manufacturing processes are required; susceptibility to attack by alkalis; limited durability because of their inherent brittleness; and difficulties in controlling pore size distribution and permeability, which are critical aspects of high performance filter media.

High temperature composite materials, in which a ceramic or carbon matrix is reinforced with a continuous fiber, are used in a variety of applications. They are most commonly used in aircraft brakes. In this application, the braking material is made from a carbon matrix reinforced with carbon fibers (carbon/carbon or C/C). Such materials have a high mechanical strength and are capable of operating at extreme temperatures, up to 3000° C. in a non oxidizing atmosphere. Composites in which both the reinforcing fiber and the matrix are both ceramic are used in specialty applications. In particular, they are used in aircraft engine parts where strength at high temperatures and low weight are needed.

Such high temperature composite materials do offer some potential for use as filter media. For example, carbon/carbon composites, due to the excellent balance of properties, have found use as a filter support. U.S. Pat. No. 4,944,996 discloses the use of a carbon/carbon support intended to receive a mineral membrane for separation procedures. U.S. Pat. No. 4,500,328 discloses the use of carbon/carbon composites to filter radioactive waste, and the use of activated carbon fiber to increase surface area. U.S. Pat. No. 5,183,546 discloses an electrochemical filter consisting of an electrically conductive fibrous material that contains microscopic particles of carbon or active charcoal.

Ceramic matrix composites have been used as hot gas filters. U.S. Pat. No. 4,968,467 discloses the use of refractory ceramic fibers matted together with a high temperature binder, such as colloidal alumina or silica, to form a tube like "candle filter." U.S. Pat. No. 5,196,120 discloses the use of a ceramic fiber-ceramic composite filter composed of ceramic fibers, preferably texturized, a carbonaceous layer thereover, and a silicon carbide coating over the carbonaceous layer, which coats substantially all of the fibers. A strong, light weight filter is achieved.

Despite the advances made in the art, of which the above are examples, ceramic and carbon based composite materials have not previously been suited to high performance filtration. This is especially true for microfiltration because of the difficulties in achieving the required porosity, surface area and permeability required for efficient separation. In general, pore size distribution and the ability of the filter to retain or capture particulate matter is a function of the fiber diameter (*Filters and Filtration Handbook*, Third Edition, 1992). In the art outlined above, fiber diameters range from 7 microns for conventional carbon fibers to 100 microns and above for some ceramic fibers. The diameters of such fibers are too large. These fibers do not provide the small pores required for efficient small particulate retention.

U.S. Pat. No. 5,138,546 discloses the addition of small carbon or charcoal particles which improves surface area and particle capture ability. However, this type of filter is not suitable for most high performance applications, particularly in the foodstuffs and chemical industries. These structures exhibit poor bonding of the particles to the substrate. In addition, there is a tendency for such constructions to particulate, in other words, release undesired particles into the filtrate stream. Also, the addition of such particles can only be performed on a random basis. There is little control with respect to uniformity and positioning.

In light of the disadvantages of the prior art, there is therefore presently a need to develop high performance filter media capable of operating in the microfiltration regime which offer: low cost; durability; chemical resistance, particularly to acids and alkalis; resistance to high temperatures, for both operation and sterilization purposes; no particulation (i. e., release of filter media particles into the filtrate stream); mechanical strength to cope with pressure swings; separation efficiency, particularly for particles in the 0.1 to 100 micron range; and biocompatibility for certain applications, such as the filtration of blood.

SUMMARY OF THE INVENTION

It is therefore an object of the present invention to provide a filter media having a high degree of mechanical integrity and stiffness, which is capable of resisting pressure changes with pulsed flows.

It is another object of the present invention to provide a filter media having controlled pore size.

It is another object of the present invention to provide a filter media having a high level of permeability.

It is another object of the present invention to provide a filter media having a high flow rate through the filter media.

It is another object of the present invention to provide a filter media having a low pressure drop across the filter media.

It is another object of the present invention to provide a filter media, which in the microfiltration range, provides a pore size distribution sufficiently small to trap most particles in the range of about 0.05 to about 10 microns.

It is another object of the present invention to provide a filter media that offers substantial versatility in construction so that a variety of constructions can be produced in order to cope with different filter applications.

It is another object of the present invention to provide a filter media that is easily cleaned, and that has a similar retention efficiency after the cleaning process.

The present invention therefore provides a filter media, including a structure comprising a blend of inorganic fibers and inorganic fiber whiskers. The filter media of the present invention is low in cost, durable, resistant to chemicals and high temperatures, not subject to particulation, high in mechanical strength and separation efficiency, biocompatible, has a high permeability, a high flow rate and a low pressure drop across the filter media.

The present invention further provides a method for preparing a filter media structure comprising mixing together inorganic fibers, inorganic fiber whiskers, an organic binder and water to form a slurry; removing excess water from said slurry by filtration; drying said slurry at a temperature sufficient to fuse the binder to form said filter media structure; and optionally heating said filter media structure at a temperature sufficient to burn off or carbonize the binder. In one embodiment, a thin layer of pyrolytic carbon is deposited on the surface of said inorganic fibers and said inorganic fiber whiskers to anchor said fibers and fiber whiskers together, further strengthening the high temperature filter media structure.

The present invention provides a further method for preparing the filter media structure comprising inorganic fibers and inorganic fiber whiskers comprising mixing together inorganic fiber whiskers and a resin, impregnating said inorganic fibers with said inorganic fiber whisker/resin mixture to form a random assemblage of inorganic fibers and fiber whiskers; carbonizing said resin/inorganic fiber whisker impregnated inorganic fibers; and optionally depositing a thin layer of pyrolytic carbon on the surface and inside said inorganic fiber whisker/resin mixture to strengthen the filter media structure.

DETAILED DESCRIPTION OF THE INVENTION

The filter media of the present invention includes a filter media structure, which comprises a blend of conventional inorganic fibers, such as carbon, ceramic, glass or silica fibers and inorganic fiber whiskers. The filter media of the present invention comprises from about 5 to about 95 percent by volume of inorganic fibers and from about 5 to about 95 percent by volume of inorganic fiber whiskers, based on the total volume of the inorganic fibers and inorganic fiber whiskers. The conventional inorganic fibers are generally from about 1 to about 15 millimeters in length, more preferably from about 5 to about 10 millimeters in length. The inorganic fiber whiskers employed in the present invention are generally from about 3 to about 5000 microns in length, more preferably about 5 to about 2000 microns in length, and most preferably from about 5 to about 300 microns in length. The conventional inorganic fibers are generally from about 3 microns to about 20 microns in diameter, preferably about 5 to about 12 microns. The fiber whiskers employed in the present invention are generally from about 0.03 to about 5 microns in diameter, more preferably from about 0.05 to about 0.2 microns in diameter. The filter media of the present invention contains interconnected porosity, such that a fluid (gaseous or liquid) can flow through it.

The filter media structure comprises conventional inorganic fibers, such as carbon and ceramic fibers and inorganic fiber whiskers. Carbon fibers are the most preferred inorganic fiber for use with the present filter media structure. Suitable carbon fibers are derived from PAN, pitch, or rayon precursors by methods well known in the art. The filter media structure may alternatively comprise ceramic fibers including, but not limited to silicon carbide, silicon nitride, aluminosilicate, silica, alumina, zirconia, ceria, glass and mixtures thereof. The inorganic fiber whiskers of the present invention may comprise at least one of alumina, carbon, ceria, zirconia, silica, glass, silicon carbide, silicon nitride, titanium carbide, titanium nitride and mixtures thereof. Carbon whiskers are the most preferred inorganic fiber whiskers for use in the filter media of the present invention.

The filter media structure prepared according to the present invention is highly permeable, and the pore size distribution is tailorable to capture most particles in the range of about 0.05 to about 100 microns, preferably 0.05 to about 20 microns. This is enabled by the use of the differing amounts of the inorganic fiber whisker sizes, that are generally from about 0.05 to about 5 microns in diameter, more preferably from about 0.05 to about 0.2 microns in diameter. In the microfiltration and nanofiltration range, the filter media structure provides a pore size distribution sufficiently small to trap particles in the range of about 0.05 to about 2 microns, such as when the diameter of the smallest inorganic fiber whiskers is in the range of about 0.05 to about 0.2 microns.

As described hereinabove, the fiber whiskers useful in the present invention include carbon whiskers and ceramic whiskers, such as silicon carbide, silicon nitride, titanium carbide, titanium nitride, silica, alumina, zirconia, ceria and glass. The most preferred fiber whiskers are carbon whiskers. Suitable carbon whiskers for use in the filter media and paper of the present invention, are vapor grown carbon whiskers having an average diameter from about 0.1 to about 0.2 microns, prepared the method disclosed by U.S. Pat. No. 5,594,060 (Alig et al.) Although vapor grown carbon whiskers are particularly useful in the novel filter media structures, the present invention is not limited only to the above mentioned vapor grown carbon whiskers and, thus, other types of carbon fibrils, filaments, fibroids, whiskers, microfibers, nanofibers meeting the composition and sizes defined above, including but not limited to those prepared by the method disclosed by U.S. Pat. No. 5,374,415 (Alig et al.), U.S. Pat. No. 5,691,054 (Tennent et al) and U.S. Pat. No. 4,663,230 (Tennent) may comprise the carbon whisker component of the filter media structure of the present invention.

The filter media of the present invention may be constructed in the form of a structure selected from the group consisting of papers; felts; needled felts; fabrics; flat, shaped or corrugated plates; tubes; open cylinders; and corrugated or pleated tubes and cylinders.

The filter media of the present invention can be made into a filter paper having small pore diameters, to control the pore size and to trap small particles. The filter paper of the present invention is prepared by conventional means for preparing a ceramic paper, mat or sheet product, by forming a slurry of feltable inorganic fibers, and according to the present invention inorganic fiber whiskers, an organic binder and water, draining the excess water by filtration through a screen, while retaining the fiber/whisker/binder mixture, and drying the resulting mixture to remove excess moisture, forming a paper. The filter paper of the present invention may be prepared by any known paper-making method, such as that disclosed by U.S. Pat. No. 3,510,394 (Cadotte), which is incorporated herein by reference. The filter paper is highly permeable, has a high flow rate and low drop pressure across the filter paper. The filter paper may also be heat stabilized to higher temperatures depending on the end use and the organic binder used in making the paper.

The filter media, if comprising carbon fibers, carbon fiber whiskers, and a stabilized or carbonized binder, is capable of operating at temperatures of up to about 500° C. in air and up to about 3000° C. in a non-oxidizing atmosphere. For high temperature applications where higher strength is required, the filter paper of the present invention may be further strengthened by anchoring the inorganic fibers to each other by depositing a small amount of carbon on the fibers by chemical vapor deposition processes. The filter media, if comprising ceramic fibers and ceramic whiskers, is capable of operating at temperatures of up to about 2000° C. in air and/or in a non-oxidizing atmosphere. The filter media of the present invention has high strength sufficient to resist loads imparted by fluctuating pressures, namely a strength defined as burst strength.

The filter media structures of the present invention may be used for microfiltration and may be used to selectively remove unwanted species in drinking water, milk, fruit juices, alcoholic beverages, such as beer and wine, cooking oil and other foodstuffs. The filter media structures of the present invention are particularly useful in removing microbial agents, such as bacteria, from drinking water.

The filter media structure may also be used to purify blood, blood plasma and to purify chemically aggressive materials comprising acids, alkalis, solvents, and organic chemicals. In addition, the filter media structures may also be used to remove particulate matter from air. In the activated state, the filter paper of the present invention can also remove chemical contaminants from gases and liquids.

The filter media structures of the present invention may also be used to remove unwanted species or particles in mechanical industrial oils, such as motor oil, used in cooling or lubricating applications, wherein the oil is recirculating oil. The filter media structures of the present invention may also be adapted to remove unwanted particles from printing inks for use in inkjet printer applications. The filter media structures are especially useful for removing unwanted particles from inks that have been previously removed from printed paper products during paper recycling processes.

The filter media structures of the present invention may also be adapted to remove unwanted species or particles from process water used in the electronics and pharmaceutical industries.

The filter media structures of the present invention may be made into a filter paper by a conventional paper making method comprising mixing together conventional inorganic fibers, inorganic fiber whiskers, and an organic binder system. The inorganic fibers, inorganic fiber whiskers and organic binder are mixed to form a slurry in water. The slurry is filtered to remove excess water, and dried at a temperature sufficient to fuse the organic binder. Optionally, a thin layer of pyrolytic carbon is deposited on the surface of the filter paper after drying, by known methods, to strengthen the filter media structure and to prevent particulation of the fibers.

The organic binder system may be a water soluble or a water insoluble binder system. The water soluble binder may include, but are not limited to organic binders, such as polyvinyl alcohol, sodium alginate and water soluble phenolics. The water insoluble binder may include, but are not limited to organic binders, such as acrylates, methacrylates, polyesters and phenolics.

Suitable phenolic resins useful in the present invention include, but are not limited to, phenolics commercially available under the trade designations USP 39 and 91LD, such as supplied by Ashland Chemical, and SC1008 such as supplied by Borden Chemical.

Suitable acrylic resins useful in the present invention include, but are not limited to, styrene acrylic resins commercially available under the trade designation Acronol 58885, from BASF Corporation.

Suitable polyester resins include, but are not limited to, polyester resins commercially available under the trade designation, Eastman WD, supplied by Eastman Kodak.

In another embodiment, the filter media of the present invention is made into a filter paper, felt or fabric by a method comprising mixing together inorganic fiber whiskers and a resin selected from the group consisting of phenolic, polyester and acrylic resins, and impregnating inorganic fibers with said inorganic fiber whisker/resin mixture. The filter media structure subsequently undergoes conventional carbon—carbon processing, including carbonizing said resin/inorganic fiber whisker impregnated inorganic fibers; and if desired, partially densifying said carbonized resin/inorganic fiber whisker impregnated inorganic fibers. Optionally, a thin layer of pyrolytic carbon is deposited on the surface of the inorganic fibers and inorganic fiber whiskers comprising the filter media structure, thus further cementing the inorganic fibers and the inorganic fiber whiskers together.

The resin/inorganic fiber whisker impregnated inorganic fibers may be formed into the desired shape on a tool or die. The molded filter media structures are heat-treated in an inert environment to temperatures from about 700° C. to about 2900° C. in order to convert the organic phases to carbon. The carbonized filter media structures of the present invention are then densified by any suitable densification technique, such as chemical vapor infiltrations, or by multiple cycle reimpregnations and carbonizations.

SPECIFIC EMBODIMENTS

The above described filter media offers substantial versatility in construction such that a variety of constructions can be produced in order to cope with different filter applications. Variations in the inorganic fiber whiskers may be made, such as whisker type (carbon or different types of ceramic whiskers); whisker density (amount of whiskers, based on the total volume of the inorganic fibers and inorganic whiskers); average whisker diameter (from about 0.03 to about 5 microns, more preferably from about 0.03 to about 0.2 microns); whisker length (from about 3 to about 5000 microns, and preferably from about 5 to about 300 microns); and whisker configuration (straight or branched). Variations in the conventional inorganic fiber may be made, such as, type of fiber (pitch, PAN, or rayon based carbon fibers and/or various ceramic fibers, such as silicon carbide, silicon nitride, aluminosilicate, silica, glass, alumina, ceria, zirconia and the like).

The pressure drop across the filter media structures of the present invention is generally from about 0.1 millibar to about 500 millibar, more preferably from about 1.5 millibar to about 150 millibar and most preferably from about 5 millibar to about 15 millibar. The low drop pressure across the filter media structures of the present invention allows for increased flow or throughput of materials through the filter media structure, thus lowering the energy costs associated with conventional pumping processes.

The filter media of the present invention has a flow rate across the filter media from about 10 liters/$m^2$/hour to about 25,000 liters/$m^2$/hour, preferably from about 20 liters/$m^2$/hour to about 500 liter/$m^2$/hour.

The filter media of the present invention also has a strength sufficient to resist loads imparted by fluctuating pressures.

GENERAL EXPERIMENTAL

A filter paper comprising a blend of inorganic fibers and fiber whiskers according to the present invention was prepared by a conventional paper making method as described hereinabove, and was tested for the ability to remove particulate matter from a feed solution. Filter fouling characteristics, cleanability characteristics and cumulative particle retention efficiency of the filter media and filter paper were evaluated by conventional filtration test methods.

Figure 1:
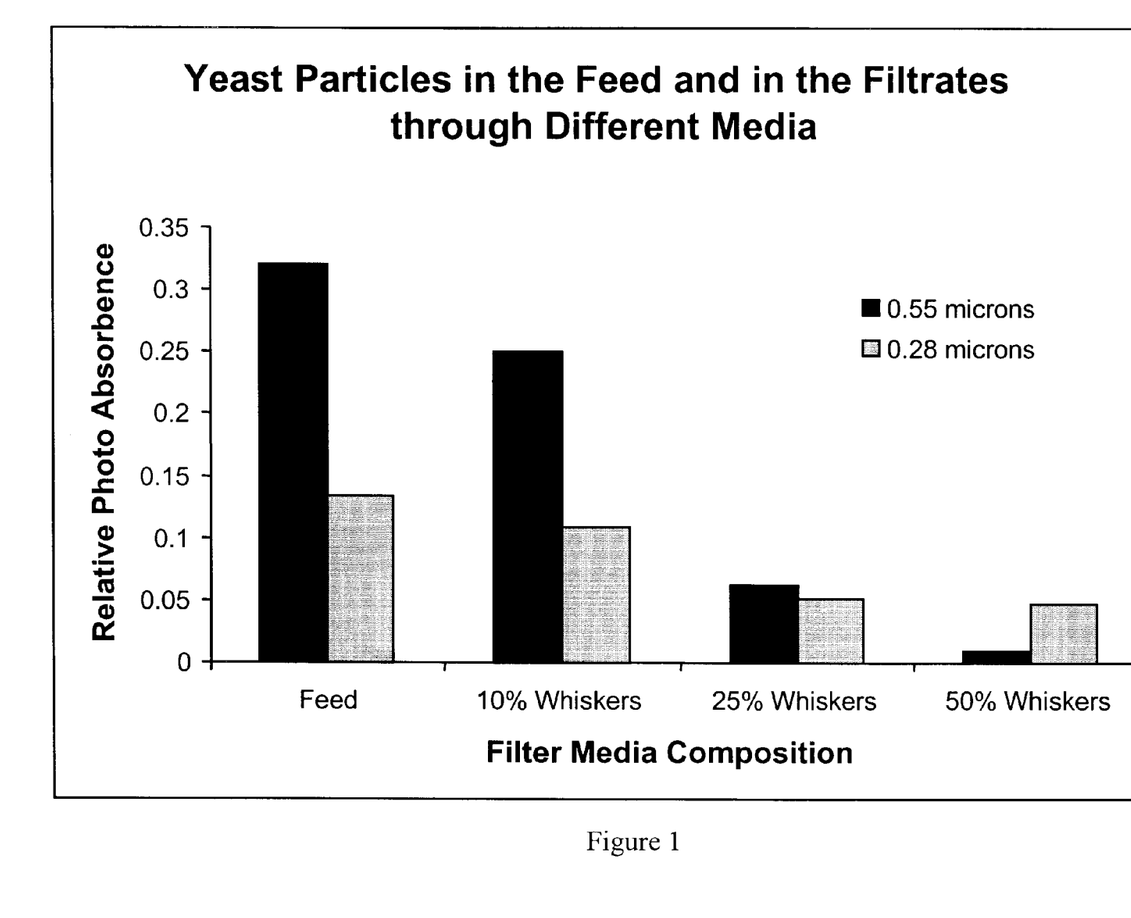
FIG. 1 is a graph comparing the of removal of yeast particles by a filter paper comprising the filter media of the present invention, containing conventional carbon fibers and either 10%, 25%, 50%, or 65% by volume of inorganic fiber whiskers.

FIG. 1 depicts the ability of filter papers comprising the filter media of the present invention, containing 10 percent by volume, 25 percent by volume, 50 percent by volume and 65 percent by volume of inorganic fiber whiskers, based on the total volume of the conventional inorganic fibers and fiber whiskers, to remove or capture yeast particles from a feed solution. The results shown in FIG. 1 demonstrate that the filter media structure of the present invention, comprising a blend of inorganic fibers and fiber whiskers, effectively captures or removes yeast particles having particle sizes in the range of about 0.28 to about 0.55 microns from a feed solution. FIG. 1 also shows the ability of the filter media structure to capture or remove yeast particles increases as the inorganic whisker content of the filter media structure increases.

Figure 2:
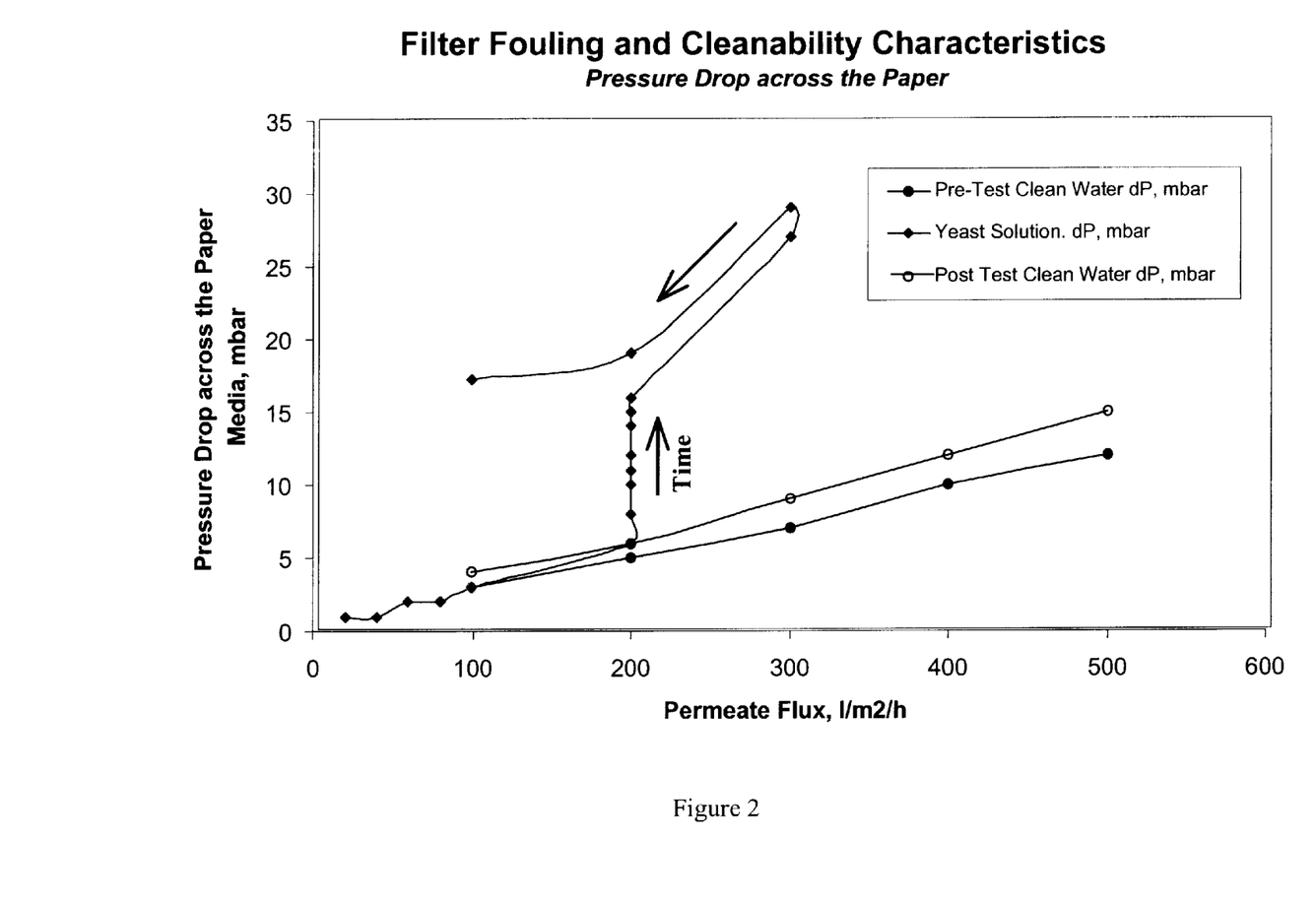
FIG. 2 is a graph depicting filter fouling and cleanability characteristics of a filter paper comprising the filter media structure of the present invention, by measuring the pressure drop across the filter media structure as a function of flow.

FIG. 2 depicts the filter fouling and cleanability characteristics of a filter paper made comprising the filter media of the present invention. Filter fouling was evaluated by measuring the pressure drop across the filter paper as a function of the permeate flux (liters/$meter^2$/hour). Permeate flux, as used throughout the specification, refers to the measure of the flow of a feed solution across a unit area of the filter media per unit time. The filter paper of the present invention was used to filter three separate test feeds in succession: 1) Pre-Test clean water; 2) a yeast particle-containing solution; and 3) Post-Test clean water. As shown in FIG. 2, the filter paper of the present invention has an initial pressure drop of about 12 mbar at a permeate flux of 500 (liters/meter$^2$/hour). After filtering a feed solution containing yeast particles and subsequent cleaning, the filter paper exhibited a pressure drop of about 15 mbar at a permeate flux of 500 (liters/meter$^2$/hour). With time, the pressure drop across the filter paper increases as yeast particles build up on the filter paper. However, upon cleaning, the filter paper regains similar pressure drop characteristics as compared to a new filter paper, which has not previously been subjected to the filtration process. Therefore, the results demonstrate that the filter media structure of the present can be easily cleaned and used in subsequent filtration processes, without loss of particle retention efficiency.

Figure 3:
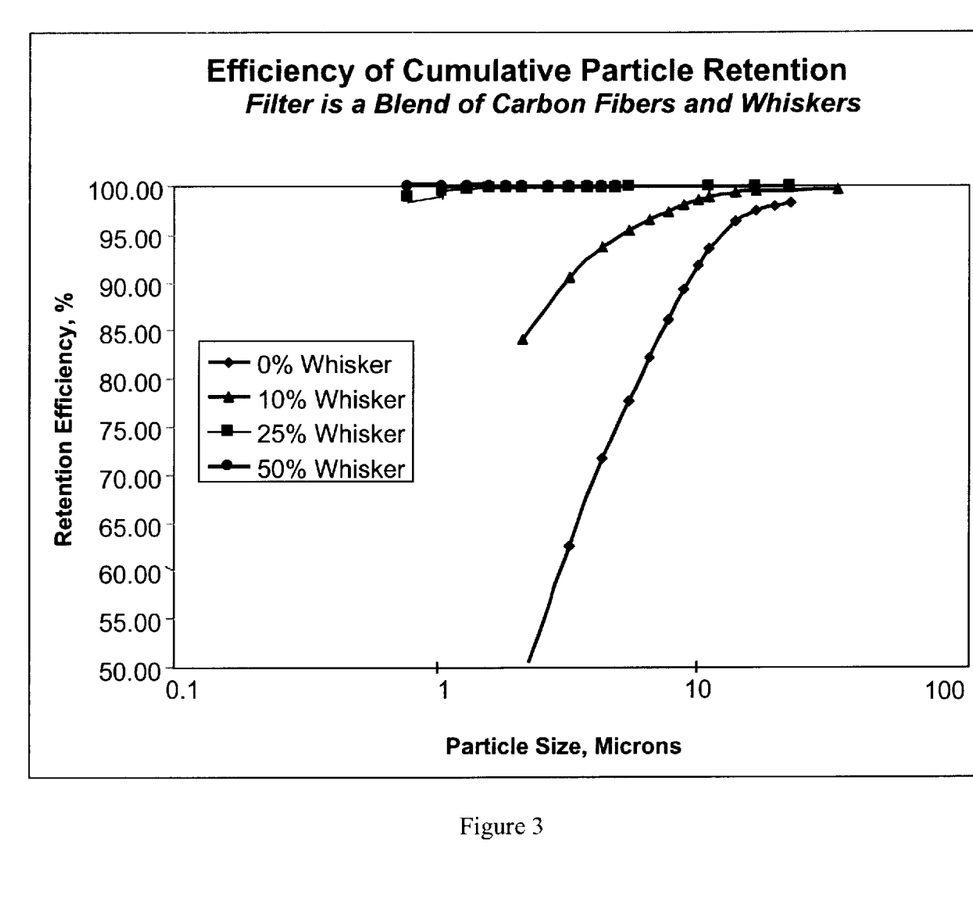
FIG. 3 is a graph comparing the efficiency of particle retention by the high performance filter paper comprising the filter media compositions of the present invention, containing conventional carbon fibers and either 0%, 10%, 25%, 50% or 65% by volume of inorganic fiber whiskers.

FIG. 3 depicts the cumulative particle retention efficiency of the filter paper of the present invention, containing 0 percent by volume (comparative),10 percent by volume, 25 percent by volume, and 50 percent by volume of inorganic fiber whiskers, based on the total volume of the conventional inorganic fibers and fiber whiskers, as a function of particle size (microns). The results shown in FIG. 3 further demonstrate that the filter media structure of the present invention, containing from about 10 percent by volume to about 50 percent by volume of inorganic fiber whiskers is highly effective at capturing or removing particles from a feed solution, having a particle size from about 1 micron to about 10 microns. The results shown in FIG. 3 further demonstrate that the filter media structure of the present invention, containing from about 25 percent by volume to about 65 percent by volume of inorganic fiber whiskers, are highly effective at capturing or removing particles from a feed solution, having a particle size from about 0.1 to about 1 micron.

Filter papers comprising the filter media of the present invention were evaluated for the ability to filter or remove unwanted yeast particles from beer products following the brewing process. The objective of beer filtration is to remove all unwanted yeast particles remaining in the beer after the brewing process. It is also desirable to remove unwanted proteins, which contribute to haziness of the beer during the cooling process. A resulting beer product should be free of all unwanted yeast particles and haze-causing proteins, while retaining the proteins that are responsible for the taste and head retention of the beer.

To test the filter papers comprising the filter media of the present invention, a filtration test was used in which the yeast particles were removed from previously unfiltered beer following the brewing process.

The results of the filtration test demonstrate that the filter media structures of the present invention exhibited continued operation at high flow rates, namely 100 liters/m$^2$/h. The filter media structures of the present invention experienced very low drop pressures, namely, from about 5 millibar to about 15 millibar, without significant fouling or particle build-up on the filter media structure. The filter media structure retained particle retention efficiency without, noticeable evidence of performance deterioration after cleaning of the filter media structure. An excellent clarity beer, having good head retention and taste, resulted from filtration with the filter media structure of the present invention, indicating that the unwanted yeast particles and undesired proteins were removed.

Conventional filters for filtering unwanted yeast particles from beer products employ various filtering substances, such as the diatomaceous earth, Kieselguhr. The filtering substance, Kieselguhr, however, is only moderately effective in removing yeast particles from beer, and many health and safety hazards are associated with its disposal. In contrast, the filter media structures of the present invention do not require any further filtering substances, such as diatomaceous earth.

The state of the art ceramic filters presently used for beer filtration require a cross flow velocity of about 360 m/min, to prevent build up or fouling of the filter structure. In contrast, the filter media structures of the present invention, based on a blend of inorganic fibers and inorganic fiber whiskers, requires a cross flow velocity of only about 10 m/min. A filtration system based on the filter media structures of the present invention, due its high permeability are, therefore, capable of operating at lower pumps speeds. The ability to operate at lower pumps speeds results in a corresponding decrease in the production costs of beer products.

The results of the filtration tests above demonstrate that the performance of the filter media structures, based on a blend of inorganic fibers and inorganic fiber whiskers, is superior in comparison to the state of the art ceramic filters, and other conventional filters requiring additional filtering substances, such as diatomaceous earth.

The filter media structures of the present invention differ from prior filter media and filter media structures in that, according to one embodiment of the present invention, the filter media structure is prepared by the mixing or blending of inorganic fibers, inorganic fiber whiskers and an organic binder. The mixture of inorganic fibers, inorganic fiber whiskers and an organic binder is made into paper by conventional paper-making techniques.

A filter media structure is prepared by impregnating a felt or fabric comprising carbon fibers with a resin/inorganic fiber whisker mixture, followed by subsequent carbon—carbon processing. The filter media structure prepared according to the present embodiment may comprise inorganic fiber whiskers of only one diameter or may be bimodal, comprising inorganic fiber whiskers having two different diameters. Previous filters include only a filter media structure comprising carbon whiskers grown directly on a carbon—carbon substrate.

The filter media structure of the present invention may be bimodal in composition. The term bimodal refers to a filter media structure comprising inorganic fiber whiskers having a particular diameter, inorganic fiber whiskers having a diameter smaller than the diameter of the inorganic fibers and an organic binder.

The filter media structure of the present invention may also be a trimodal composition. The term trimodal refers to a filter media structure comprising a mixture or blend of inorganic fibers and inorganic fiber whiskers having three different diameters and an organic binder. For example, a filter paper prepared according to the present invention may comprise from 5 to about 40 percent by volume of inorganic fibers having a diameter from about 5 to about 20 microns, based on the total volume of inorganic fibers and fiber whiskers. The inorganic fibers are mixed or blended with about 10 to about 50 percent by volume of inorganic fiber whiskers, having a diameter of about 0.1 to about 0.3 microns, based on the total volume of inorganic fibers and inorganic fiber whiskers, and about 10 to about 85 percent by volume of inorganic fiber whiskers, having a diameter of about 0.03 to about 0.06 microns, based on the total volume of the inorganic fibers and fiber whiskers. The resulting trimodal filter media structure prepared according to the present invention is capable of filtering particles having a particle size in the range of about 0.03 to about 0.06 microns.

The present invention therefore provides a filter media structure that can be made into the form of a filter paper comprising a mixture of conventional inorganic fibers and inorganic fiber whiskers, having a high permeability, high flow rate and a low drop pressure across the filter paper.

The objects of the present invention are accomplished by the production and use of high performance filter media structure comprising a blend of inorganic fibers and inorganic fiber whiskers for use as a filter media system. The advantages of this filter media with respect to durability, chemical and high temperature resistance, particulation, mechanical strength, particle retention efficiency, and high permeability have been demonstrated. It should be understood that the present invention is not limited to the specific embodiments described above, but includes the variations, modifications, and equivalent embodiments that are defined by the following claims.

We claim:

1. A high performance filter media including a structure comprising a blend of inorganic fibers, inorganic fiber whiskers, and a binder, wherein the filter media has an interconnected porosity to allow fluid to flow through it and an average pore size and pore size distribution sufficiently small to capture particles in the size range of about 0.5 to 100 microns.

2. The high performance filter media, according to claim 1, wherein the inorganic fibers are selected from the group consisting of carbon fiber and ceramic fibers.

3. The high performance filter media, according to claim 2, wherein the carbon fibers are derived from a precursor fiber selected from the group consisting of PAN, pitch or rayon.

4. The high performance filter media, according to claim 2, wherein the ceramic fibers are selected from the group consisting of silicon carbide, silicon nitride, aluminosilicate, glass, silica, alumina, zirconia, ceria and mixtures thereof.

5. The high performance filter media, according to claim 1, wherein the inorganic fiber whiskers are selected from the group consisting of carbon, silicon carbide, silicon nitride, titanium carbide, titanium nitride, alumina, zirconia, ceria, silica, glass and mixtures thereof.

6. The filter media, according to claim 1, wherein the filter media structure comprises about 5 to about 95 weight percent inorganic fibers and wherein the filter media comprises about 5 to about 95 weight percent inorganic fiber whiskers, based on the total volume of the inorganic fibers and the fiber whiskers.

7. The filter media, according to claim 1, wherein the fiber whiskers are from about 3 to about 5000 microns in length.

8. The filter media, according to claim 1, the fiber whiskers have a range of about 5 to about 300 microns in length.

9. The filter media, according to claim 1, wherein the average diameter of the inorganic fiber whiskers is from about 0.03 to about 5 microns.

10. The filter media, according to claim 1, wherein the average diameter of the inorganic fiber is from about 3 to about 100 microns.

11. The filter media, according to claim 1, providing a pore size distribution in the microfiltration range sufficiently small to trap particles in the size range of about 0.1 to about 10 microns.

12. The filter media, according to claim 1, wherein the filter media structure is selected from the group consisting of paper, felt, needled felt, woven fabric and non-woven fabric.

13. The filter media, according to claim 1, wherein said filter media has a permeability as measured by a pressure drop across the filter media from about 0.1 millibar to about 500 millibar.

14. The filter media, according to claim 1, wherein said filter media has a permeability as measured by a pressure drop across the filter media from about 5 millibar to about 150 millibar.

15. The filter media, according to claim 1, wherein said filter media has a permeability as measured by a pressure drop across the filter media from about 15 millibar to about 500 millibar.

16. The filter media, according to claim 1, having a flow rate through the filter media from about 10 liters/m$^2$/h to about 25,000 liters/m$^2$/h.

17. The filter media, according to claim 1, wherein said filter media after cleaning has a particle retention efficiency similar to unused filter media.

18. The filter media, according to claim 1, wherein said filter media has strength sufficient to resist loads imparted by fluctuating pressures.

19. The filter media, according to claim 1, wherein said filter media comprises carbon fibers and carbon whiskers, and wherein said filter media is operable at temperatures of from the freezing point of a first condensing gas to about 500° C. in air and up to about 3000° C. in a non-oxidizing atmosphere.

20. The filter media, according to claim 1, wherein said filter media comprises ceramic fibers and ceramic whiskers, and wherein said filter media is operable at temperatures of up to about two thirds of the lowest melting temperature of the ceramic fibers and whiskers comprising filter media.

21. The filter media, according to claim 1, wherein said filter media is adapted for use in microfiltration and nanofiltration processes.

22. The filter media, according to claim 1, wherein said filter media is adapted for use in high purity filtration process.

23. The filter media, according to claim 1, wherein said filter media is adapted for use in removing unwanted species from process water.

24. The filter media, according to claim 23, wherein said process water is used in electronics industry.

25. The filter media, according to claim 23, wherein said process water is used in the pharmaceutical industry.

26. The filter media, according to claim 1, wherein said filter media is adapted for use in selectively removing unwanted species in foodstuffs.

27. The filter media, according to claim 26, wherein said foodstuffs are liquids.

28. The filter media, according to claim 1, wherein said filter media is adapted to remove unwanted species from drinking water.

29. The filter media, according to claim 28, wherein said unwanted species is a microbial agent.

30. The filter media, according to claim 29, wherein said microbial agent is bacteria.

31. The filter media, according to claim 1, wherein said filter media is adapted for use in selectively removing unwanted species in milk.

32. The filter media, according to claim 1, wherein said filter media is adapted for use in selectively removing unwanted species in fruit juices.

33. The filter media, according to claim 1, wherein said filter media is adapted for use in selectively removing unwanted species in alcoholic beverages.

34. The filter media, according to claim 33, wherein said alcoholic beverages are selected from the group consisting of beer, wine and alcoholic cider.

35. The filter media, according to claim 1, wherein said filter media is adapted for use in selectively removing unwanted species in cooking oil.

36. The filter media, according to claim 1, wherein said filter media is adapted for purifying whole blood and blood plasma.

37. The filter media, according to claim 1, wherein said filter media is adapted for purifying chemically aggressive materials.

38. The filter media, according to claim 37, wherein said aggressive materials are selected from the group consisting of liquids and gases.

39. The filter media, according to claim 1, wherein said filter media is adapted for purifying acids.

40. The filter media, according to claim 1, wherein said filter media is adapted for purifying alkalis.

41. The filter media, according to claim 1, wherein said filter media is adapted for purifying solvents.

42. The filter media, according to claim 1, wherein said filter media is adapted for purifying organic chemicals.

43. The filter media, according to claim 1, wherein said filter media is adapted for removing unwanted particles from industrial oils.

44. The filter media, according to claim 43, wherein said industrial oils are used in cooling and lubricating processes.

45. The filter media, according to claim 43, wherein said industrial oil is recirculating oil.

46. The filter media, according to claim 43, wherein said industrial oil is single use oil.

47. The filter media, according to claim 43, wherein said industrial oil is previously used motor oil.

48. The filter media, according to claim 1, wherein said filter media is adapted for removing unwanted particles and fibers from printing ink.

49. The filter media, according to claim 48, wherein said printing ink is adapted for use in inkjet printers.

50. The filter media, according to claim 48, wherein said printing ink is previously removed from printed paper during paper recyling.

51. The filter media, according to claim 1, wherein said filter media is adapted for removing particulate matter from the air.

* * * * *